(12) United States Patent
Okuzono

(10) Patent No.: US 11,005,362 B2
(45) Date of Patent: May 11, 2021

(54) POWER SUPPLY APPARATUS AND METHOD OF CONTROLLING POWER SUPPLY APPARATUS

(71) Applicant: CANON KABUSHIKI KAISHA, Tokyo (JP)

(72) Inventor: Ryotaro Okuzono, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 721 days.

(21) Appl. No.: 15/795,876

(22) Filed: Oct. 27, 2017

(65) Prior Publication Data

US 2018/0131269 A1    May 10, 2018

(30) Foreign Application Priority Data

Nov. 7, 2016    (JP) .............................. JP2016-217500

(51) Int. Cl.
*H02M 1/42* (2007.01)
*H04N 1/00* (2006.01)

(52) U.S. Cl.
CPC ...... *H02M 1/4225* (2013.01); *H04N 1/00896* (2013.01); *H04N 1/00904* (2013.01); *H04N 2201/0094* (2013.01)

(58) Field of Classification Search
None
See application file for complete search history.

(56) References Cited

U.S. PATENT DOCUMENTS

| 7,092,266 B2 * | 8/2006 | Frank ........................ G05F 1/70 363/65 |
| 7,247,996 B2 | 7/2007 | Morishita |
| 9,325,172 B2 | 4/2016 | Okuzono |
| 2010/0246229 A1 | 9/2010 | Lu |
| 2013/0300310 A1 | 11/2013 | Hu |
| 2017/0006688 A1 | 1/2017 | Dai et al. |

FOREIGN PATENT DOCUMENTS

| CN | 101847937 A | 9/2010 |
| CN | 102751698 A | 10/2012 |
| CN | 103889118 A | 6/2014 |
| CN | 103997237 A | 8/2014 |
| JP | 2007-090830 A | 4/2007 |
| JP | 2012-019583 A | 1/2012 |
| JP | 2016-217500 A | 1/2012 |
| JP | 5119576 B2 | 1/2013 |

OTHER PUBLICATIONS

Office Action in Chinese Patent Application No. 201711070524.8, dated Jun. 3, 2019 (with English translation).

* cited by examiner

*Primary Examiner* — Jeffrey A Gblende
*Assistant Examiner* — Henry E Lee, III
(74) *Attorney, Agent, or Firm* — Venable LLP

(57) ABSTRACT

A power supply apparatus of the present invention has a power factor correction circuit that corrects a power factor; a voltage converter connected to a secondary side of the power factor correction circuit; a power control unit that outputs a first signal for turning the power factor correction circuit on, and outputs a second signal for turning the voltage converter on; and a signal output unit that, in accordance with having being inputted with the first signal and the second signal, outputs a signal for turning the voltage converter on.

16 Claims, 13 Drawing Sheets

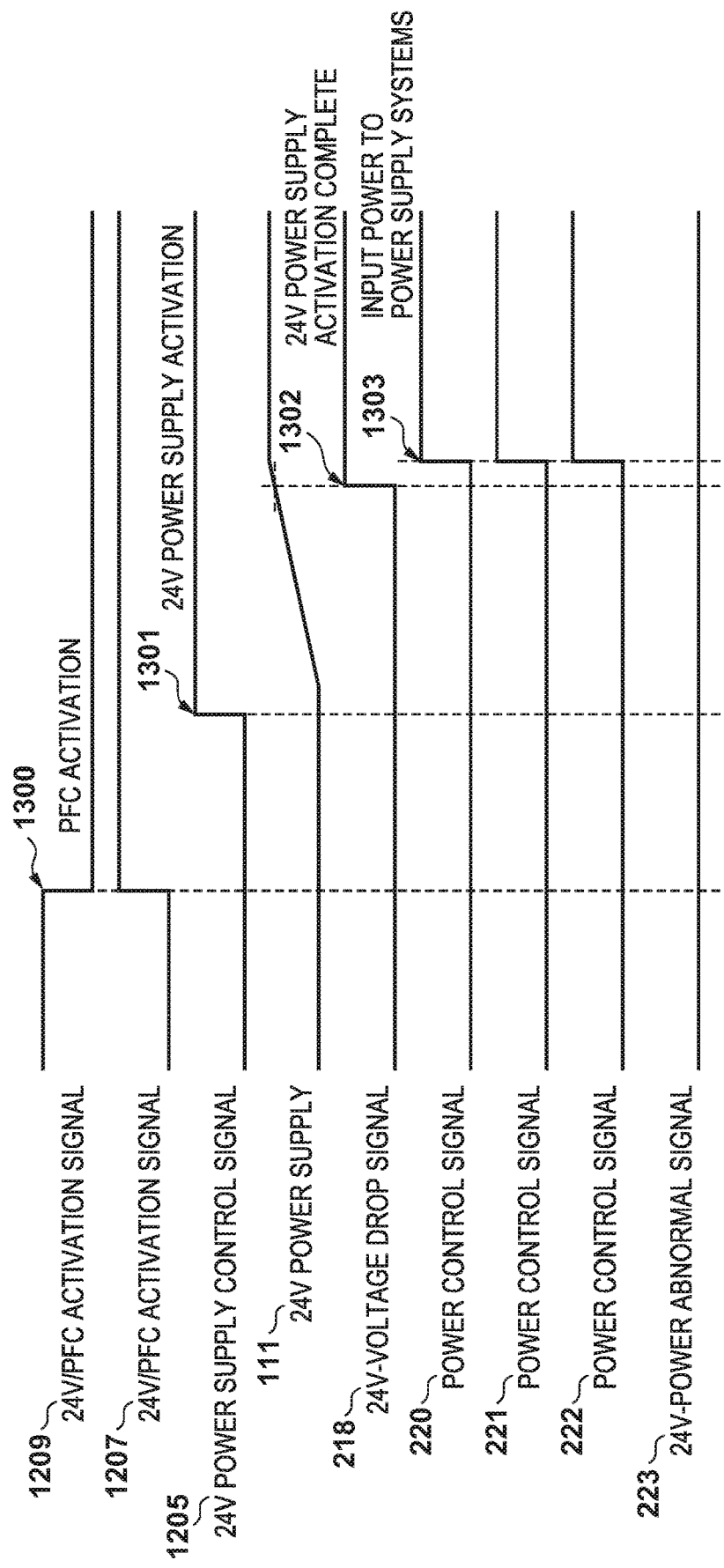

POWER SUPPLY APPARATUS AND METHOD OF CONTROLLING POWER SUPPLY APPARATUS

BACKGROUND OF THE INVENTION

Field of the Invention

The present invention relates to a power supply apparatus and a method of controlling a power supply apparatus.

Description of the Related Art

Conventionally, in an image processing apparatus such as a printer, a facsimile apparatus, and a copying machine, a predetermined power supply generated by a power supply apparatus is supplied to each load of the image processing apparatus. Such an image processing apparatus is further provided with a power supply control apparatus, and when the image processing apparatus does not operate for a certain amount of time, for example control is performed to cause a transition from a normal mode in which an operation by a user is possible to a power saving mode in which power consumption is caused to be decreased.

Meanwhile, devices that are provided with a power factor correction circuit such as an active filter in the power supply apparatus for power factor correction for the entire device and harmonic frequency countermeasures have been developed in recent years. The power factor correction circuit is something that suppresses generation of a harmonic frequency, corrects a power factor seen from an AC power supply side, and corrects a current waveform to a sinusoid similar to an alternating current input power supply (AC) voltage waveform in a macro sense, by performing a switching operation that uses the switching circuit. However, a power supply apparatus provided with such a power factor correction circuit consumes power unnecessarily by a switching operation of the power factor correction circuit even when in the power saving mode that does not need power factor correction and is for causing power consumption to decrease, and so power saving is impeded. Accordingly, several techniques for reducing power consumption by the power factor correction circuit have been proposed. These techniques control off/on of the power factor correction circuit in the power supply apparatus, in accordance with an external signal, for example. Japanese Patent Laid-Open No. 2007-90830, which assumes a printer, recites controlling a power factor correction circuit in accordance with whether or not an apparatus is in a power saving mode. In Japanese Patent No. 5119576, which assumes a projector, discloses controlling on/off of a power factor correction circuit in accordance with a control signal for controlling on/off of a device that consumes a large amount of electric power such as a lamp.

However, in the techniques disclosed in the aforementioned Japanese Patent Laid-Open No. 2007-90830 and Japanese Patent No. 5119576, while it is possible to control on/off of a power factor correction circuit, a mechanism for turning a subsequent stage converter on after the power factor correction circuit is turned on is not disclosed. When the subsequent stage converter is turned on while the power factor correction circuit is not operating, there is a possibility that a peak current will increase in addition to a harmonic frequency being generated, and a current greater than a rated current will flow through a primary side circuit such as an AC cable. In this way, there is a concern that, when a current greater than or equal to the rated current flows, a component of the primary side circuit will generate heat, and the power supply apparatus will malfunction.

SUMMARY OF THE INVENTION

An aspect of the present invention is to eliminate the above-mentioned problem with conventional technology.

A feature of the present invention is to provide a technique for enabling a power supply to start after a power factor correction circuit is reliably caused to operate, while suppressing cost.

According to a first aspect of the present invention, there is provided a power supply apparatus, comprising: a power factor correction circuit configured to correct a power factor; a voltage converter connected to a secondary side of the power factor correction circuit; a power control unit configured to output a first signal for turning the power factor correction circuit on, and output a second signal for turning the voltage converter on; and a signal output unit configured to, in accordance with having being inputted with the first signal and the second signal, output a signal for turning the voltage converter on.

According to a second aspect of the present invention, there is provided a power supply apparatus operable to, upon transitioning to a power saving state, turn a power factor correction circuit off and turn a second voltage converter connected to a secondary side of the power factor correction circuit off while a first voltage converter connected to the secondary side of the power factor correction circuit remains on, the apparatus comprising: a power control unit configured to output a first signal for turning the power factor correction circuit on and output a second signal for turning the second voltage converter on, when returning from the power saving state; and a signal output unit configured to, in accordance with having being inputted with the first signal and the second signal, output a signal for turning the second voltage converter on.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a timing chart for explaining operation of the PFC unit and the 24V converter when the image processing apparatus according to the fourth embodiment of the present invention returns from the power saving mode.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
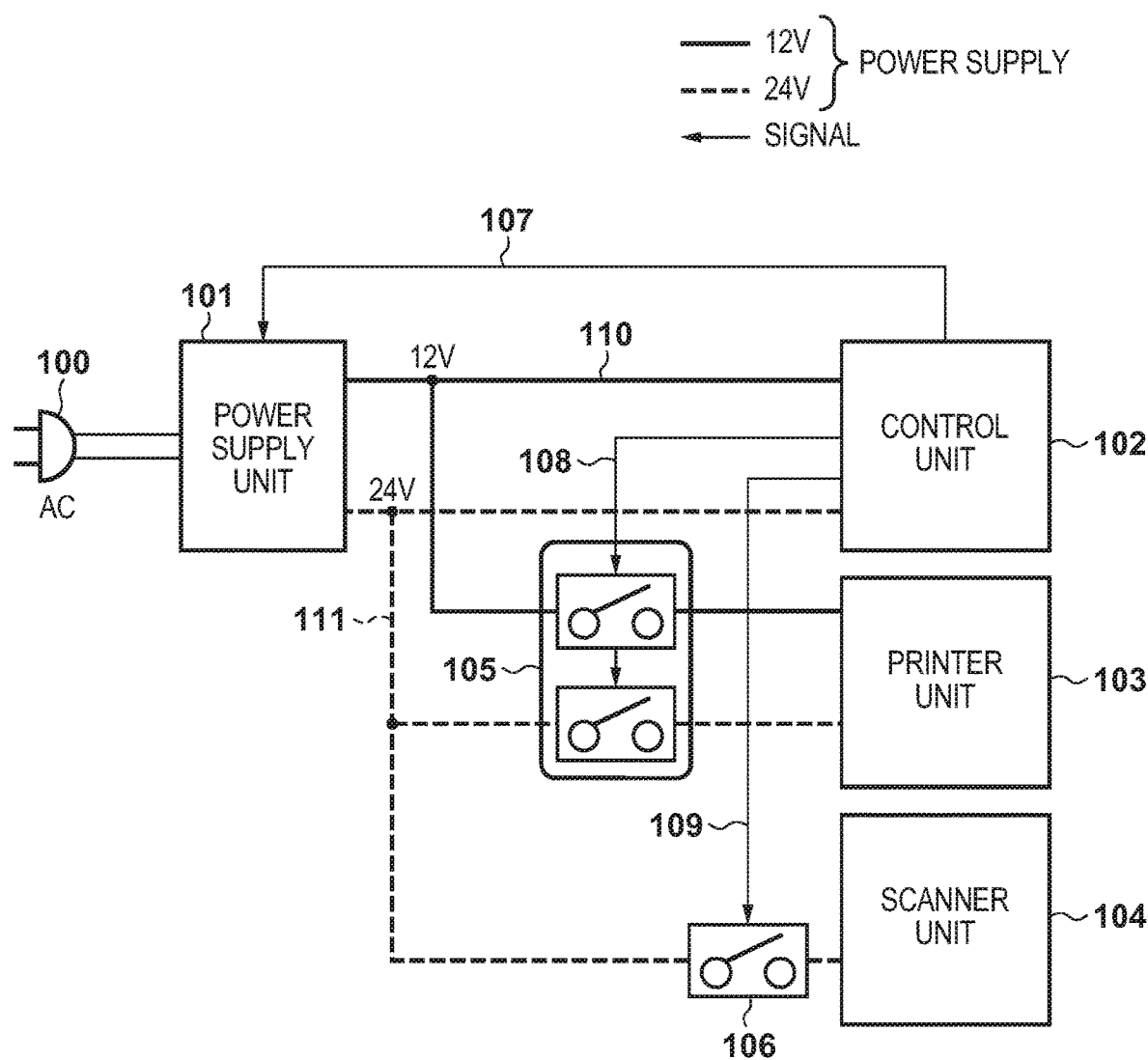
FIG. 1 is a block diagram for explaining an overview configuration of an image processing apparatus according to a first embodiment of the present invention.

FIG. 1 is a block diagram for explaining an overview configuration of an image processing apparatus according to a first embodiment of the present invention.

The image processing apparatus is provided with a power supply unit 101, a control unit 102, a printer unit 103, a scanner unit 104, a printer power control unit 105, a scanner power control unit 106, and an AC plug 100. The scanner unit 104 generates digital image data by optically reading an image of an original. The printer unit 103 performs image formation (printing) to a printing medium in a sheet shape (a sheet), in accordance with an electrophotographic method, for example. Note that, if the printer unit 103 is capable of image processing on both sides of a printing medium in a sheet form (for example, printing paper), the printing method thereof is not limited to the electrophotographic method, and another printing method such as an ink-jet method or a thermal transfer method for example may be used. The control unit 102 controls the entirety of the image processing apparatus, and performs control for, for example, a copy operation for causing image data obtained by reading an original by the scanner unit 104 to be output to the printer unit 103 and printed. A configuration of the control unit 102 is explained in detail later with reference to FIG. 2. The power supply unit 101 is configured so as to, upon receiving an alternating current commercial power supply via the AC plug 100, supplies power of predetermined voltages (12V and 24V here) to the scanner unit 104, the control unit 102 and the printer unit 103. Note that, in the first embodiment, it is assumed that a 12V power supply 110 and a 24V power supply 111 are generated by the power supply unit 101, but there is no particular limitation to an output voltage. In addition, the power supply unit 101 changes an operation state of the power supply unit 101 in accordance with a 24V/PFC activation signal 107 outputted from the control unit 102. The printer power control unit 105 supplies power or disconnects a power supply to the printer unit 103 in accordance with a power control signal 108 outputted from the control unit 102. The scanner power control unit 106 supplies power or disconnects a power supply to the scanner unit 104 in accordance with a power control signal 109 outputted from the control unit 102. When the power control signal 108 is a high level, the printer power control unit 105 supplies the printer unit 103 with a 12V and a 24V power supply, and when the power control signal 108 is a low level, the printer power control unit 105 disconnects supply of power to the printer unit 103. Similarly, the scanner power control unit 106 supplies a 24V power supply to the scanner unit 104 when the power control signal 109 is a high level, and disconnects supply of power to the scanner unit 104 when the power control signal 109 is a low level.

Next, with reference to FIG. 1, explanation is given regarding a power supply state for when the image processing apparatus according to the first embodiment is in a power saving mode.

At a time of the power saving mode of the image processing apparatus, power is supplied to only the control unit 102 which performs power supply control, and a supply of power to the printer unit 103 via the printer power control unit 105 is disconnected. Supply of power via the scanner power control unit 106 is similarly disconnected for the scanner unit 104. In addition, in the power saving mode, because the 24V/PFC activation signal 107 enters an off state (a high level), the power supply unit 101 stops supply of the 24V power supply 111, and also causes operation of a power factor correction circuit of the power supply unit 101 to stop.

Figure 2:
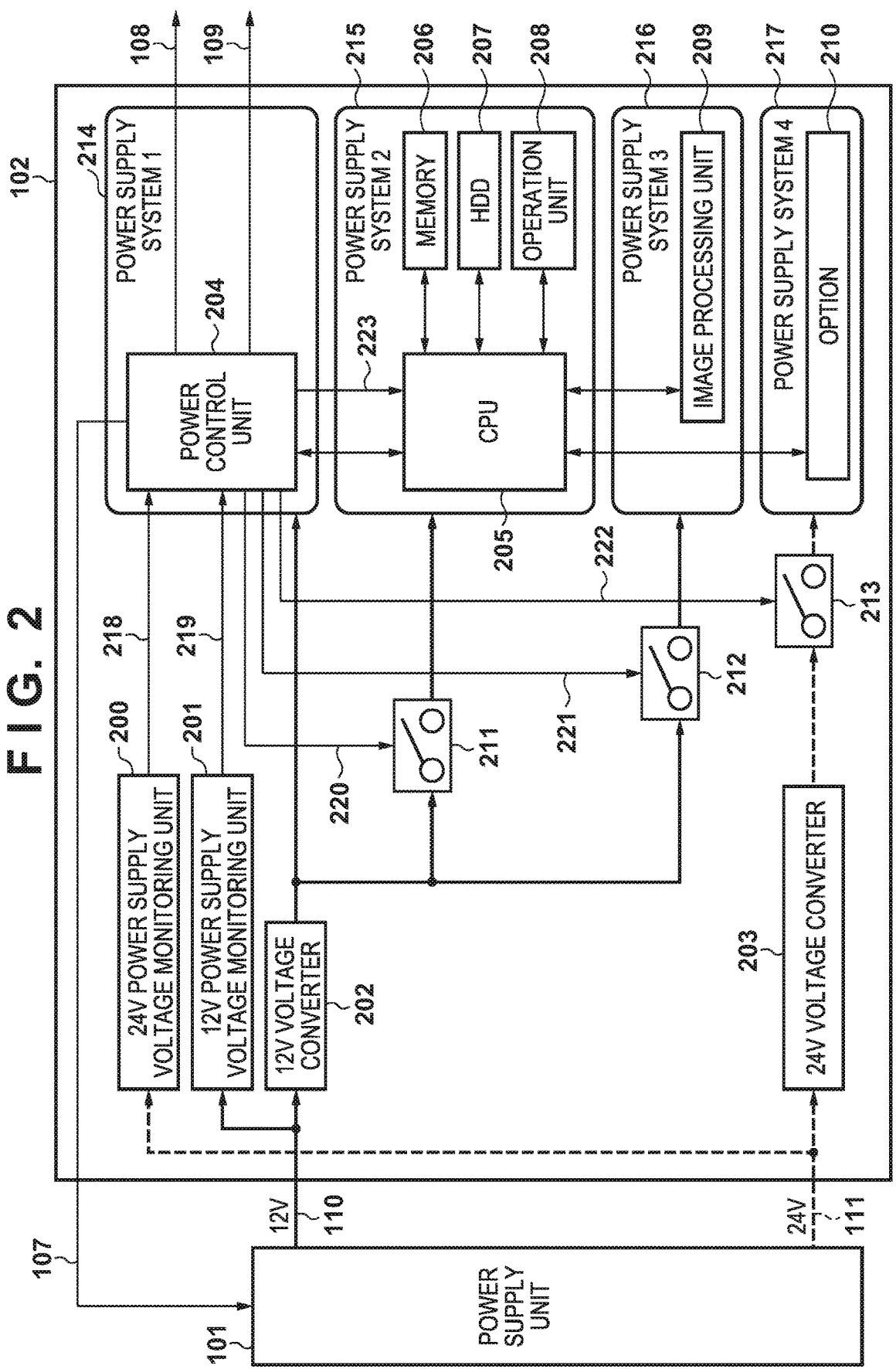
FIG. 2 is a block diagram for explaining a configuration of a control unit according to the first embodiment of the present invention.

FIG. 2 is a block diagram for explaining a configuration of the control unit 102 according to the first embodiment of the present invention. Note that portions in common with the previously described FIG. 1 are indicated by the same reference numerals in FIG. 2.

The control unit 102 has a 24V power supply voltage monitoring unit 200, a 12V power supply voltage monitoring unit 201, a 12V voltage converter 202, a 24V voltage converter 203, a power control unit 204, and power supply control units 211, 212, and 213. Furthermore, the control unit 102 has a CPU 205, memory 206, an HDD 207, an operation unit 208, an image processing unit 209, and an option 210. The 24V power supply voltage monitoring unit 200 monitors a voltage of the 24V power supply 111 supplied from the power supply unit 101, and when the voltage becomes less than or equal to a predetermined voltage, notifies the power control unit 204 by setting a 24V-voltage drop signal 218 to a low level. In addition, when the voltage of the 24V power supply 111 becomes greater than or equal to a predetermined voltage, the 24V power supply voltage monitoring unit 200 notifies the power control unit 204 by setting the 24V-voltage drop signal 218 to a high level. The 12V power supply voltage monitoring unit 201 monitors a voltage of the 12V power supply 110 supplied from the power supply unit 101, and when the voltage becomes less than or equal to a predetermined voltage, notifies the power control unit 204 by setting a 12V-voltage drop signal 219 to a low level. In addition, when the voltage of the 12V power supply 110 becomes greater than or equal to a predetermined voltage, the 12V power supply voltage monitoring unit 201 notifies the power control unit 204 by setting the 12V-voltage drop signal 219 to a high level. The 12V voltage converter 202 and the 24V voltage converter 203 convert a power supply voltage supplied from the power supply unit 101 to a voltage requested by a respective unit and supply the unit with this voltage. The power control unit 204 is connected to the 24V power supply voltage monitoring unit 200, the 12V power supply voltage monitoring unit 201, the power supply control units 211, 212, and 213, and the CPU 205. Furthermore, the power control unit 204 is connected to the printer power control unit 105 and the scanner power control unit 106 via the power-supply control signals 108 and 109. The power control unit 204 controls the power supply control units 211, 212, and 213 for supplying or disconnecting a power supply to each unit of the image processing apparatus, in accordance with states of the 24V power supply voltage monitoring unit 200 and the 12V power supply voltage monitoring unit 201 and a control program executed by the CPU 205.

The CPU 205 is a central processing unit that performs control of the entirety of the image processing apparatus, deploys the control program stored in the HDD 207 to the memory 206, and by executing this program realizes functions such as a copy function, a print function, and a FAX function. The memory 206 is a volatile memory such as a DDR SDRAM that is connected to the CPU 205, and functions as a main memory for storing the control program executed by the CPU 205 or user data created thereby. The HDD 207 stores, for example, a program that is executed by the CPU 205, or various setting information relating to the image processing apparatus. The operation unit 208 is provided with a display panel and hard keys including a power saving mode release button or the like, and receives various instructions inputted by a user. The image processing unit 209 is connected to the CPU 205, the printer unit 103 and the scanner unit 104, performs image processing such as a color space conversion on digital image data obtained from the scanner unit 104, and outputs data after image processing to the CPU 205. In addition, the image processing unit 209 performs image processing such as the color space conversion on the digital image data obtained from the scanner unit 104, converts an image processing result to bitmap data, and outputs it to the printer unit 103. Power is supplied to the option 210 via the 24V voltage converter 203. The option 210 is prepared for a function extension, and for example an accelerator for an image processing function or a network function such as a wireless LAN is attached.

Next, with reference to FIG. 2, explanation is given for power supply systems of the image processing apparatus.

A power supply system 1 (214) is a power supply system for supplying power to the power control unit 204. For the power supply system 1, the power supply is not disconnected regardless of the power supply state, as long as the alternating current commercial power supply from the AC plug 100 is being supplied. Accordingly, the power control unit 204 constantly performs management of the power supply state of the entirety of the image processing apparatus.

A power supply system 2 (215) is a power supply system for supplying power to the CPU 205, the memory 206, the HDD 207 and the operation unit 208. Control of disconnection/supply of power for the power supply system 2 is performed by controlling the power supply control unit 211 in accordance with a power control signal 220 outputted from the power control unit 204. Note that supply of power is stopped for the power supply system 2 when in the power saving mode for reducing power consumption. Power is supplied to the power supply system 2 when the power control signal 220 is set to a high level, and supply of power to the power supply system 2 is stopped when the power control signal 220 is set to a low level.

A power supply system 3 (216) is a power supply system for supplying power to the image processing unit 209. Control of disconnection/supply of power for the power supply system 3 is performed by controlling the power supply control unit 212 in accordance with a power control signal 221 outputted from the power control unit 204. Note that supply of power is stopped for the power supply system 3 when in the power saving mode for reducing power consumption. Power is supplied to the power supply system 3 when the power control signal 221 is set to a high level, and supply of power to the power supply system 3 is stopped when the power control signal 221 is set to a low level.

A power supply system 4 (217) is a power supply system for supplying power to the option 210. Control of disconnection/supply of power for the power supply system 4 is performed by controlling the power supply control unit 213 in accordance with a power control signal 222 outputted from the power control unit 204. Note that supply of power is stopped for the power supply system 4 when in the power saving mode for reducing power consumption. Power is supplied to the power supply system 4 when the power control signal 222 is set to a high level, and supply of power to the power supply system 3 is stopped when the power control signal 222 is set to a low level.

Figure 3:
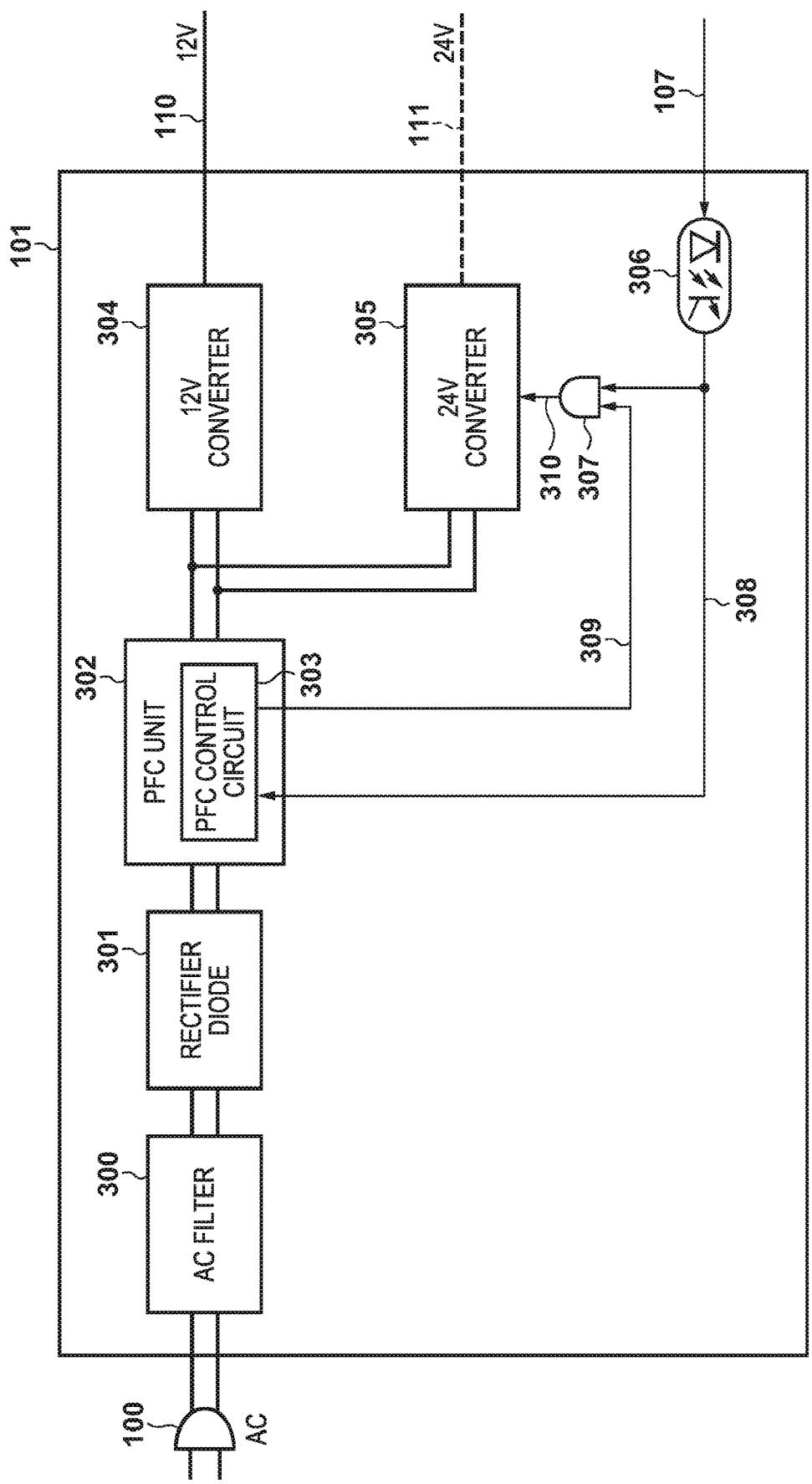
FIG. 3 is a block diagram for explaining a configuration of a power supply unit according to the first embodiment of the present invention.

FIG. 3 is a block diagram for explaining a configuration of the power supply unit 101 according to the first embodiment of the present invention.

The power supply unit 101 generates direct current power to be supplied to a load, from the alternating current commercial power supply that is supplied via the AC plug 100. The power supply unit 101 has an AC filter 300, a rectifier diode 301, a power factor correction circuit (hereinafter referred to as a PFC unit) 302, a power factor correction control circuit (hereinafter referred to as a PFC control circuit) 303, and a 12V converter 304 and a 24V converter 305 which are voltage conversion circuits. It also has, for example, an AND circuit 307 and a photocoupler 306 for receiving a 24V/PFC activation signal 107 from the control unit 102.

The AC filter 300 is a noise counter-measure component for removing electromagnetic noise that leaks out of the image processing apparatus or enters the image processing apparatus through the alternating current commercial power supply supplied via the AC plug 100. The rectifier diode 301 for rectifying the alternating current commercial power supply is connected to an output terminal of the AC filter 300, and the rectifier diode 301 converts an alternating power supply to a direct current power supply. The PFC unit 302 that includes, for example, a booster circuit of a switching type, is connected to an output terminal of the rectifier diode 301. The PFC control circuit 303 which is for controlling operation of the PFC unit 302 is integrated in the PFC unit 302. The PFC control circuit 303 connects an output terminal of the rectifier diode 301 and an output terminal of the PFC unit 302 so as to bypass the PFC unit 302 when a 24V/PFC activation signal 308, converted from the 24V/PFC activation signal 107, is in an off state (a low level). Accordingly, when the 24V/PFC activation signal 308 is in the off state, it is possible to reduce power consumed by the PFC unit 302. The 12V converter 304 and the 24V converter 305 are connected to an output terminal of the PFC unit 302.

In accordance with switching control of an internal switch element, the 12V converter 304 converts a direct-current voltage inputted via the PFC unit 302 to a predetermined direct-current voltage (12V here) to be supplied to each load. In accordance with switching control of an internal switch element, the 24V converter 305 converts a direct-current voltage inputted via the PFC unit 302 to a predetermined direct-current voltage (24V here) to be supplied to each load. Note that the 24V converter 305 can switch an operation state in accordance with a signal level of the power supply control signal 310, and operation of the 24V converter 305 stops by the power supply control signal 310 being set to the off state (low level). The photocoupler 306 electrically insulates a primary side and a secondary side, and performs a power source conversion on the 24V/PFC activation signal 107 outputted from the power control unit 204 of the control unit 102 and supplies it to the PFC control circuit 303 as the 24V/PFC activation signal 308. The 24V/PFC activation signal 308 is connected to the AND circuit 307 and the PFC control circuit 303 of the PFC unit 302. The PFC control circuit 303 can switch an operation state of the PFC unit 302 in accordance with the state of the 24V/PFC activation signal 308, and outputs a PFC activation completion signal 309 that indicates the operation state of the PFC unit 302. The AND circuit 307 supplies a logical product of the 24V/PFC activation signal 308 and the PFC activation completion signal 309 to the 24V converter 305 as a power supply control signal 310. Here, when the 24V/PFC activation signal 308 and the PFC activation completion signal 309 are both a high level, the power supply control signal 310 becomes a high level, and the 24V converter 305 activates.

Figure 4:
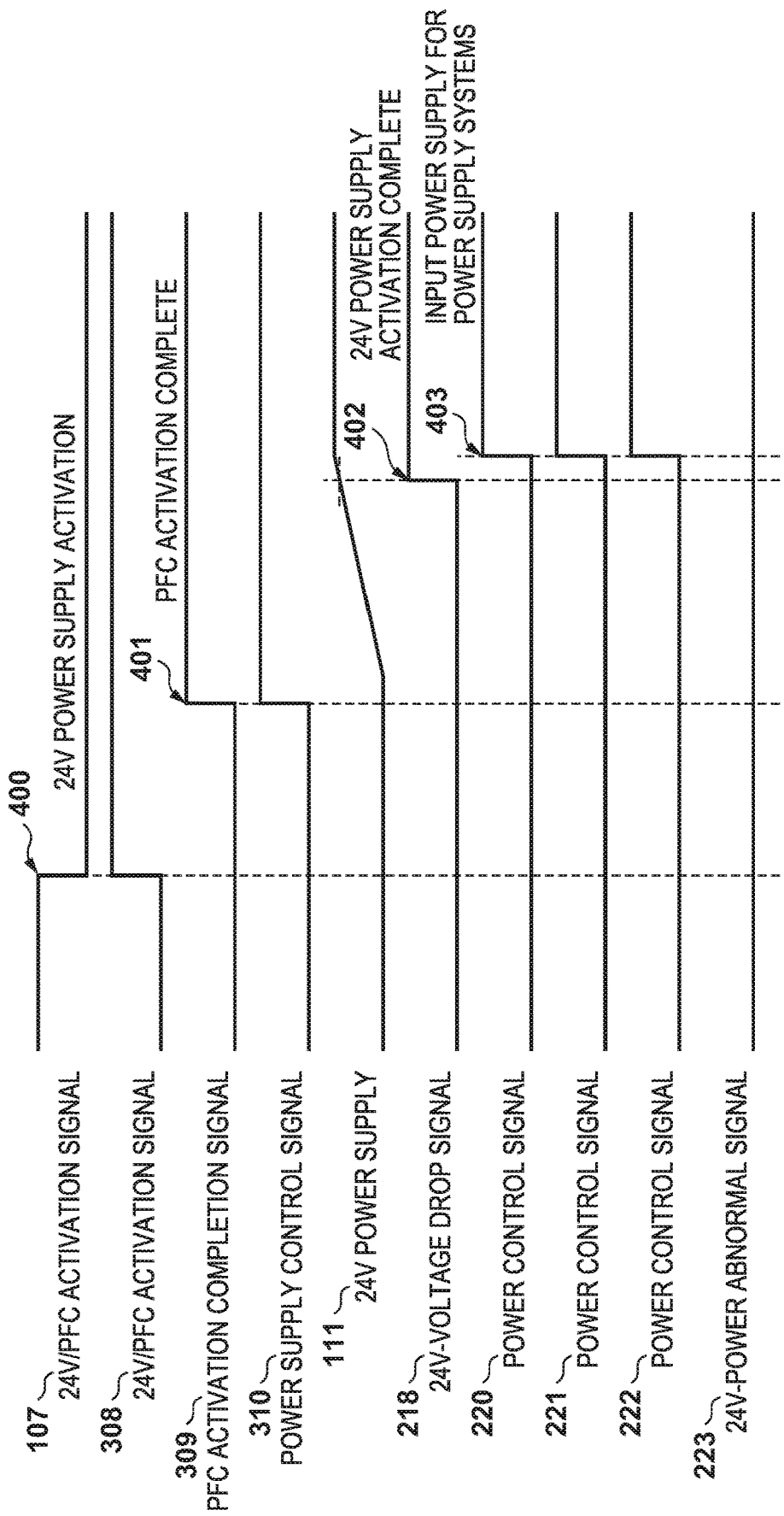
FIG. 4 is a timing chart for a time of successfully activating a PFC unit and a 24V converter in the image processing apparatus according to the first embodiment.
Figure 5:
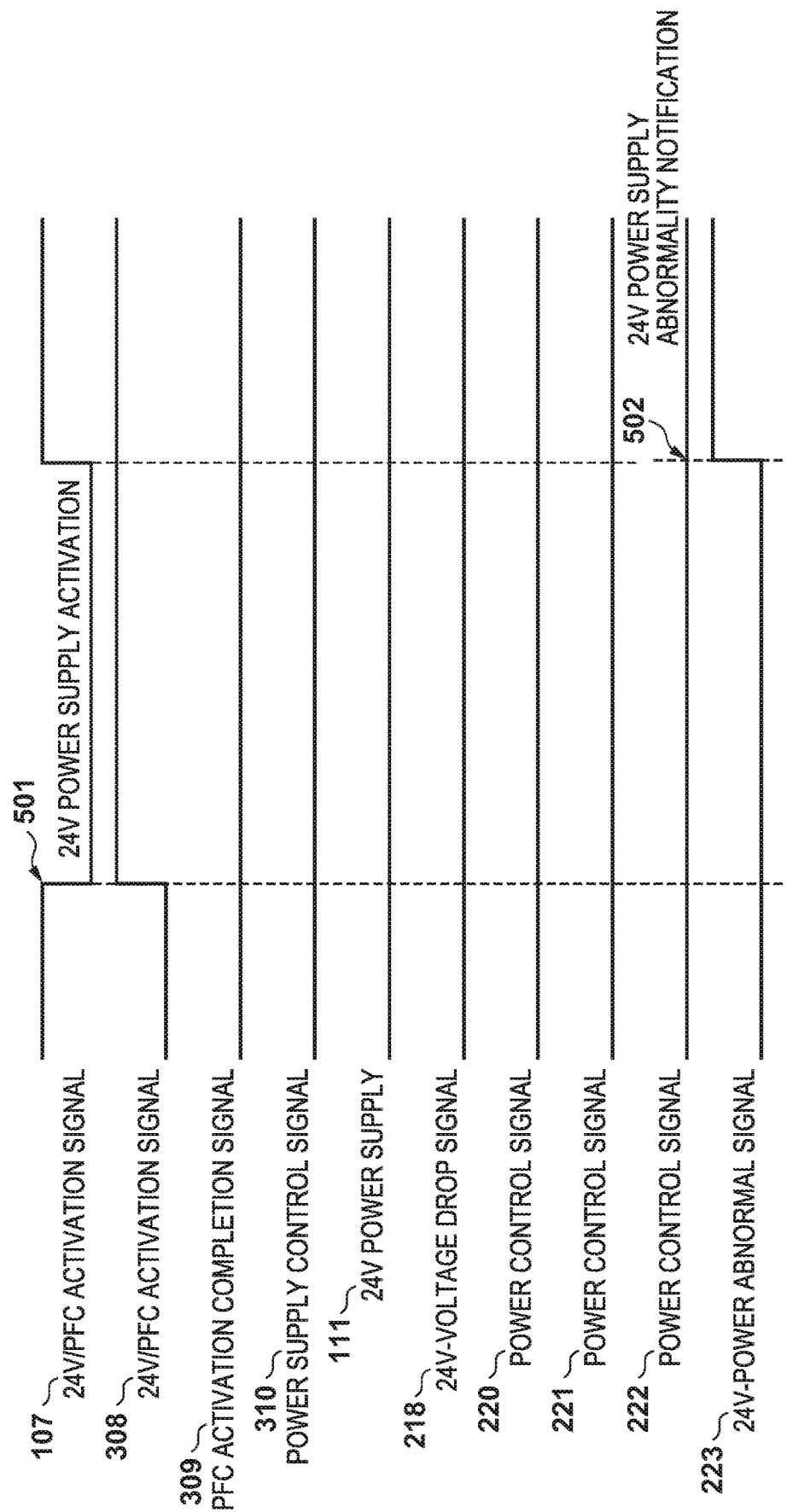
FIG. 5 is a timing chart that indicates a case in which an abnormality is generated when activating a PFC unit and a 24V converter in the image processing apparatus according to the first embodiment.

FIG. 4 and FIG. 5 are timing charts for activation of the 24V converter 305 and the PFC unit 302 according to the first embodiment of the present invention.

FIG. 4 is a timing chart for a time of successfully activating the PFC unit 302 and the 24V converter 305 in the image processing apparatus according to the first embodiment.

In FIG. 4, when the image processing apparatus returns from the power saving mode, the 24V/PFC activation signal 107 is set to the low level at reference numeral 400 to restart operation of the printer unit 103 and the scanner unit 104. Accordingly, the 24V/PFC activation signal 308 is generated by the photocoupler 306 and supplied to the PFC control circuit 303. Upon detecting that the 24V/PFC activation signal 308 has become the high level, the PFC control circuit 303 starts operation of the PFC unit 302. In this way, when activation of the PFC unit 302 completes, at reference numeral 401 the PFC activation completion signal 309 changes from the low level to the high level. When the 24V/PFC activation signal 308 and the PFC activation completion signal 309 both become the high level, the power supply control signal 310 which is the output of the AND circuit 307 changes from the low level to the high level. Accordingly, the 24V converter 305 starts a switching operation, and generates a 24V power supply voltage. Upon detecting that the voltage of the 24V power supply 111 supplied from the power supply unit 101 has become greater than or equal to a predetermined voltage, the 24V power supply voltage monitoring unit 200, at reference numeral 402, changes the 24V-voltage drop signal 218 from the low level to the high level. Accordingly, the power control unit 204 detects that the 24V-voltage drop signal 218 has become the high level, and, at reference numeral 403, changes power control signals 220, 221, and 222 from the low level to the high level, and starts supply of power to all power supply systems 2-4. Consequently, in such a case, a 24V-power abnormal signal 223 outputted to the CPU 205 from the power control unit 204 remains at the low level.

FIG. 5 is a timing chart for explaining a case in which an abnormality is generated when activating a PFC unit and a 24V converter the PFC unit 302 and the 24V converter 305 in the image processing apparatus according to the first embodiment.

In FIG. 5, when the image processing apparatus returns from the power saving mode, the 24V/PFC activation signal 107 is set to the low level at reference numeral 501 to restart operation of the printer unit 103 and the scanner unit 104. Accordingly, processing for activation of the PFC unit 302 and the 24V converter 305 of the power supply unit 101 is started. Accordingly, the 24V/PFC activation signal 308 is generated by the photocoupler 306 of the power supply unit 101 and supplied to the PFC control circuit 303. Upon detecting that the 24V/PFC activation signal 308 has become the high level, the PFC control circuit 303 starts operation of the PFC unit 302, but when the PFC unit 302 is not successfully activated, the PFC activation completion signal 309 does not change and remains in the low-level state. At this point, the power control unit 204, because the power control unit 204 cannot detect that the 24V-voltage drop signal 218 has become the high level within a certain amount of time, at reference numeral 502 notifies the CPU 205 by changing the 24V-power abnormal signal 223 from the low level to the high level.

Figure 6:
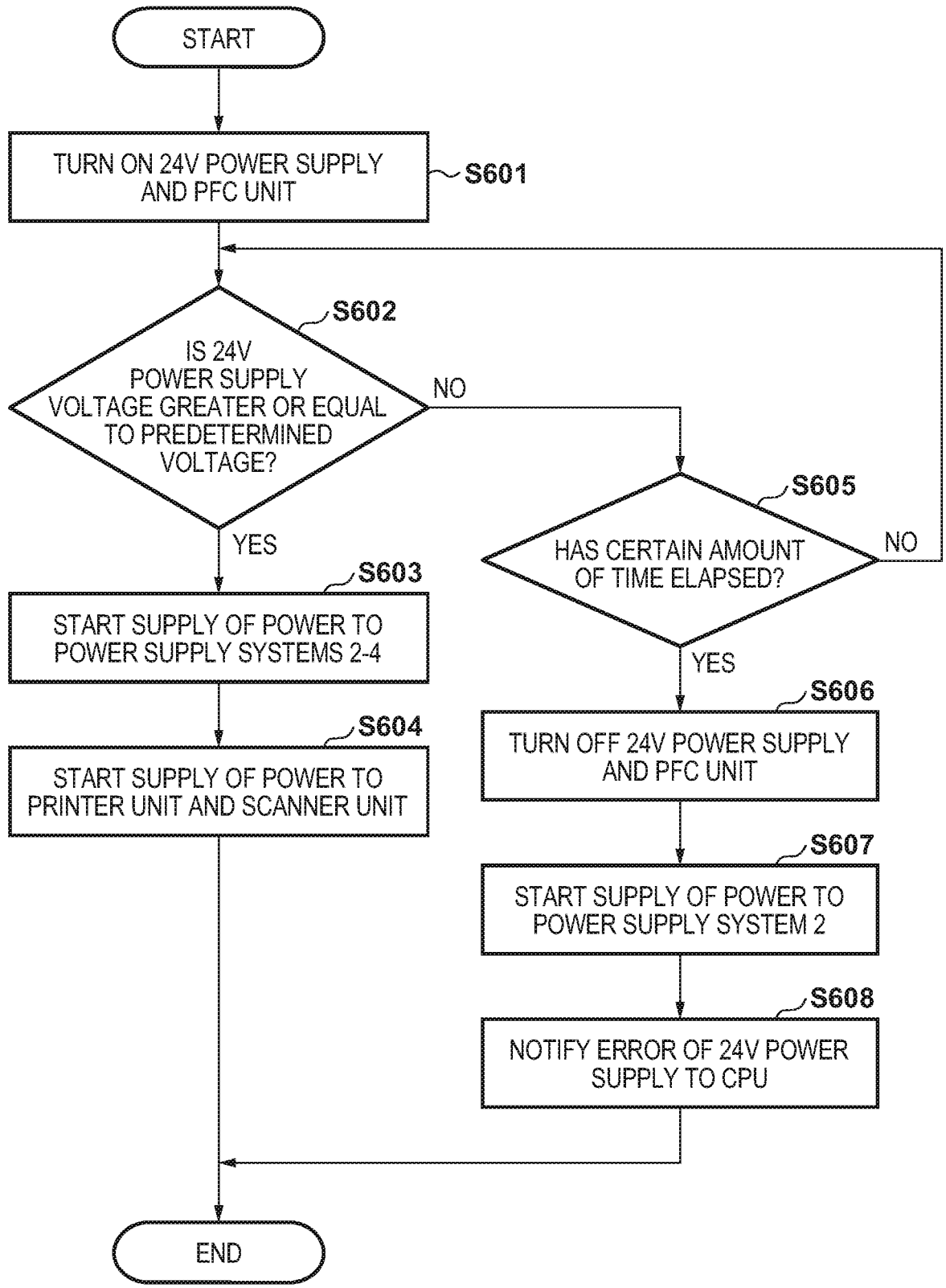
FIG. 6 is a flowchart for describing processing when a power control unit according to the first embodiment of the present invention returns from a power saving mode.

FIG. 6 is a flowchart for describing processing when the power control unit 204 according to the first embodiment of the present invention returns from a power saving mode.

Upon returning from the power saving mode, firstly, in step S601, the power control unit 204 sets the 24V/PFC activation signal 107 to the low level, and starts operation of the PFC unit 302 and the 24V converter 305 of the power supply unit 101. Next, the processing proceeds to step S602, and the power control unit 204 determines whether or not the voltage of the 24V power supply 111 has become greater than or equal to a predetermined voltage by determining whether the 24V-voltage drop signal 218 outputted by the 24V power supply voltage monitoring unit 200 has become the high level. When the power control unit 204 determines in step S602 that the 24V power supply 111 has become greater than or equal to the predetermined voltage by the 24V-voltage drop signal 218 becoming the high level, the processing proceeds to step S603. In step S603, the power control signals 220, 221, and 222 are set to the high level, and supply of power to the power supply system 2 through the power supply system 4 is started via the power supply control units 211 to 213. The processing proceeds to step S604, and the power control unit 204 sets the power-supply control signals 108 and 109 to the high level to set the printer power control unit 105 and the scanner power control unit 106 to an energized state. In this way, supply of power to the printer unit 103 and the scanner unit 104 starts, and this processing ends.

Meanwhile, when the power control unit 204 determines in step S602 that the 24V power supply 111 has not become greater than or equal to the predetermined voltage by the 24V-voltage drop signal 218 becoming the low level, the processing proceeds to step S605, and a determination is made as to whether or not a certain amount of time has elapsed. When the power control unit 204 determines that the certain amount of time has elapsed, the processing proceeds to step S606, and otherwise the processing returns to step S602. In step S606, the power control unit 204 determines which of the 24V converter 305 or the PFC unit 302 is abnormal, and sets the 24V/PFC activation signal 107 to the high level to stop operation of the PFC unit 302 and the 24V converter 305. Next, the processing proceeds to step S607, and the power control unit 204 starts supply of power to the power supply system 2 to activate the CPU 205. In step S608, the power control unit 204 outputs the 24V-power abnormal signal 223 at the high level to the CPU 205 to make a notification of the abnormality of the 24V power supply 111, and this processing ends.

Figure 7:
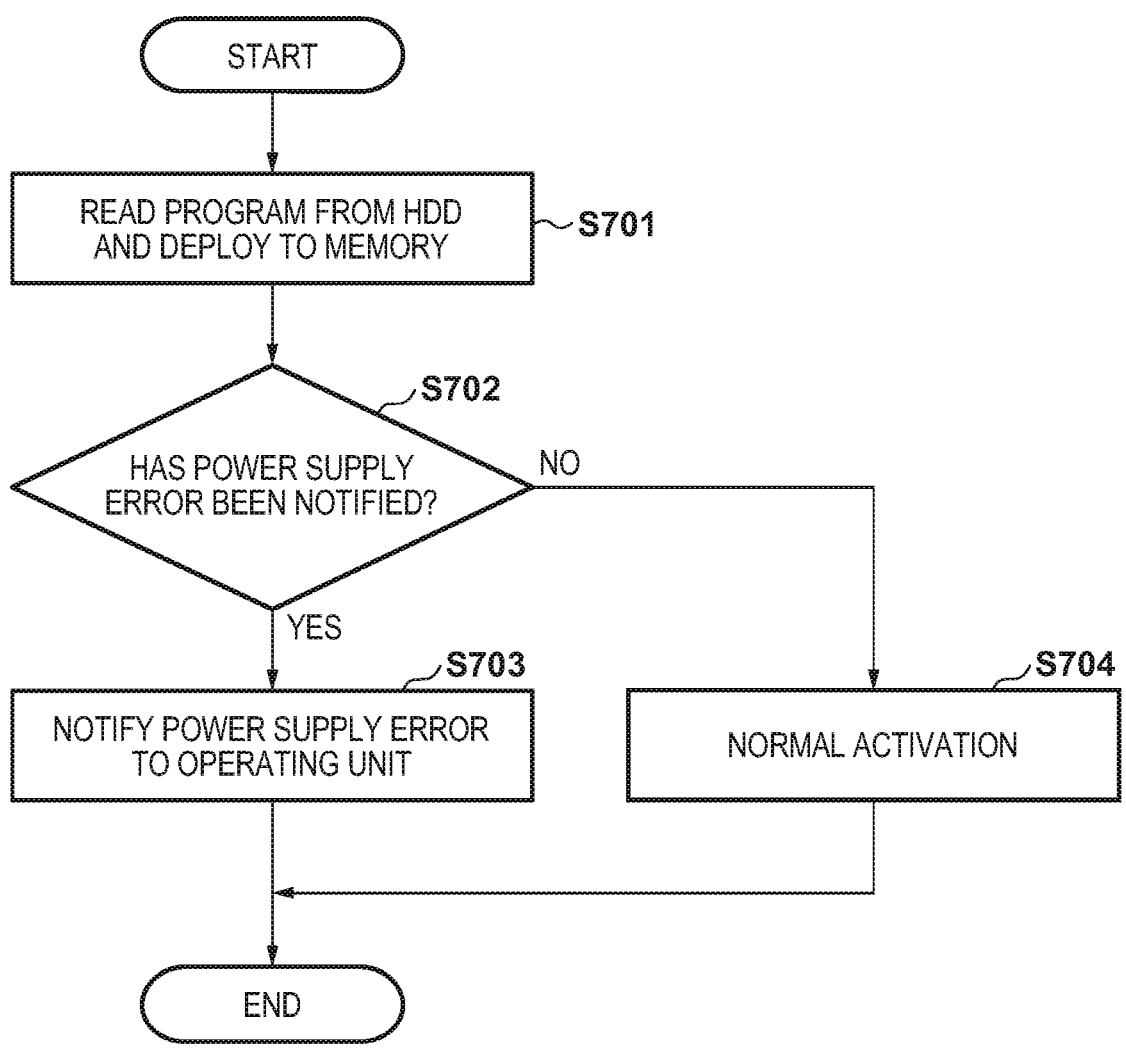
FIG. 7 is a flowchart for describing processing for a time of a power on that is executed by a CPU of the image processing apparatus according to the first embodiment of the present invention.

FIG. 7 is a flowchart for describing processing for a time of a power on that is executed by the CPU 205 of the image processing apparatus according to the first embodiment of the present invention. Note that this processing is achieved by the CPU 205 deploying a program stored in the HDD 207 into the memory 206, and executing the program deployed to the memory 206.

Firstly, in step S701, when power is supplied, the CPU 205 reads a control program from the HDD 207 and deploys it to the memory 206. Next, the processing proceeds to step S702, and the CPU 205 determines whether or not the 24V power supply 111 is normal, from state of the 24V-power abnormal signal 223 outputted by the power control unit 204. When the CPU 205 determines that the 24V power supply 111 is normal by the 24V-power abnormal signal 223 being the low level, the processing proceeds to step S704, and normal activation of the image processing apparatus starts. Meanwhile, if the CPU 205 determines in step S702 that the 24V power supply 111 is abnormal by the 24V-power abnormal signal 223 being the high level, the processing proceeds to step S703, and the CPU 205 notifies a user by displaying that the 24V power supply 111 is abnormal to the operation unit 208, and this processing ends.

By the first embodiment as explained above, a control signal for a PFC unit and a control signal for a 24V converter are set to be common, and an activation completion signal of the PFC unit is used as a part of a control signal for the 24V converter. Accordingly, it is possible to start supply of a 24V power supply after the PFC unit has been reliably caused to operate, while reducing a number of components and suppressing cost.

Second Embodiment

Next, a second embodiment of the present invention will be described. In the second embodiment, explanation is given with an example of a case in which a control signal for a PFC unit and a control signal for a 24V converter 805 are not common. Note that a configuration of the image processing apparatus and an internal configuration of the control unit 102 are mostly the same as that in the first embodiment. However, in the second embodiment, there is a difference in that, a PFC activation signal 813 and a 24V activation signal 814 are supplied from the power control unit 204 to the power supply unit 101 in place of the 24V/PFC activation signal 107, in the configuration of the control unit 102 of FIG. 2.

Figure 8:
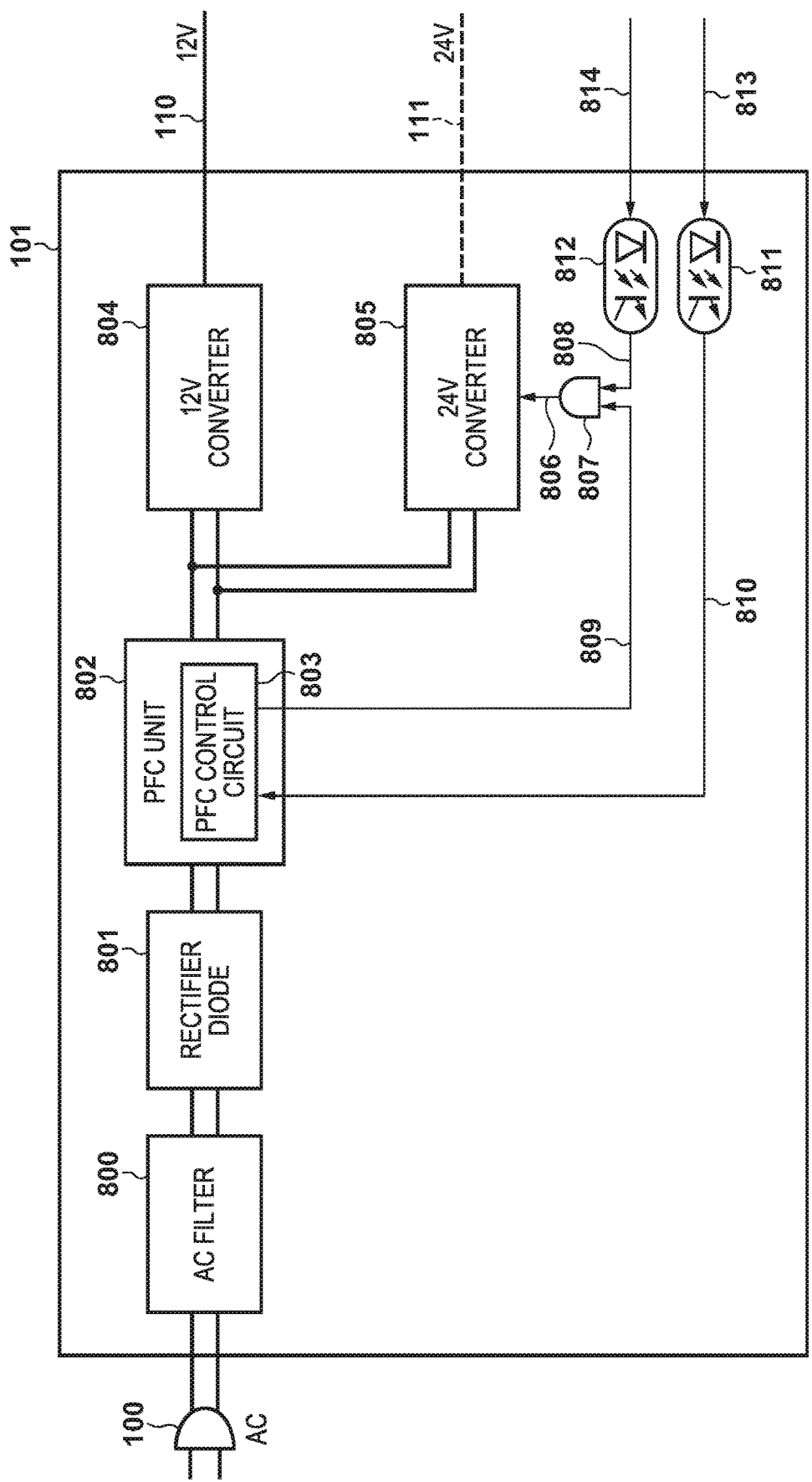
FIG. 8 is a block diagram for explaining a configuration of a power supply unit according to a second embodiment of the present invention.

FIG. 8 is a block diagram for explaining a configuration of the power supply unit 101 according to the second embodiment of the present invention. The power supply unit 101 has an AC filter 800, a rectifier diode 801, a PFC unit 802, a PFC control circuit 803, a 12V converter 804, the 24V converter 805, photocouplers 811 and 812, an AND circuit 807, or the like.

The AC filter 800 is a noise counter-measure component for removing electromagnetic noise that leaks out of the image processing apparatus or enters the image processing apparatus through the alternating current commercial power supply supplied via the AC plug 100. The rectifier diode 801 for rectifying the alternating current commercial power supply is connected to an output terminal of the AC filter 800, and the rectifier diode 801 converts an alternating power supply to a direct current power supply. The PFC unit 802 that includes, for example, a booster circuit of a switching type, is connected to an output terminal of the rectifier diode 801. The PFC control circuit 803 which is for controlling operation of the PFC unit 802 is integrated in the PFC unit 802. When the PFC activation signal 810 becomes a low level, the PFC control circuit 803 connects an output terminal of the rectifier diode 801 and an output terminal of the PFC unit 802 so as to bypass the PFC unit 802 to reduce power consumed by the PFC unit 802. The 12V converter 804 and the 24V converter 805 are connected to an output terminal of the PFC unit 802. In accordance with switching control of an internal switch element, the 12V converter 804 converts a direct-current voltage inputted via the PFC unit 802 to a predetermined direct-current voltage (12V here) to be supplied to each load. In accordance with switching control of an internal switch element, the 24V converter 805 converts a direct-current voltage inputted via the PFC unit 802 to a predetermined direct-current voltage (24V here) for supplying to each load. Note that, for the 24V converter 805, an operation state can be switched in accordance with the 24V power supply control signal 806, and operation of the 24V converter 805 stops when the 24V power supply control signal 806 becomes the low level. The photocoupler 811 electrically insulates a primary side and a secondary side, and converts the PFC activation signal 813 outputted from the power control unit 204 of the control unit 102 and outputs it as the PFC activation signal 810. The photocoupler 812 similarly electrically insulates a primary side and a secondary side, and converts the 24V activation signal 814 outputted from the power control unit 204 of the control unit 102 and outputs it as a 24V activation signal 808. The PFC activation signal 810 is supplied to the PFC control circuit 803 of the PFC unit 802. The PFC control circuit 803 activates when the PFC activation signal 810 becomes the high level, and sets a PFC activation completion signal 809 indicating an operation state of the PFC unit 802 to a high level and outputs it. The AND circuit 807 takes a logical product of the 24V activation signal 808 and the PFC activation completion signal 809, and supplies the logical product to the 24V converter 805 as the 24V power supply control signal 806. When the 24V power supply control signal 806 becomes the high level, the 24V converter 805 outputs a 24V power supply voltage in accordance with switching control.

Figure 9:
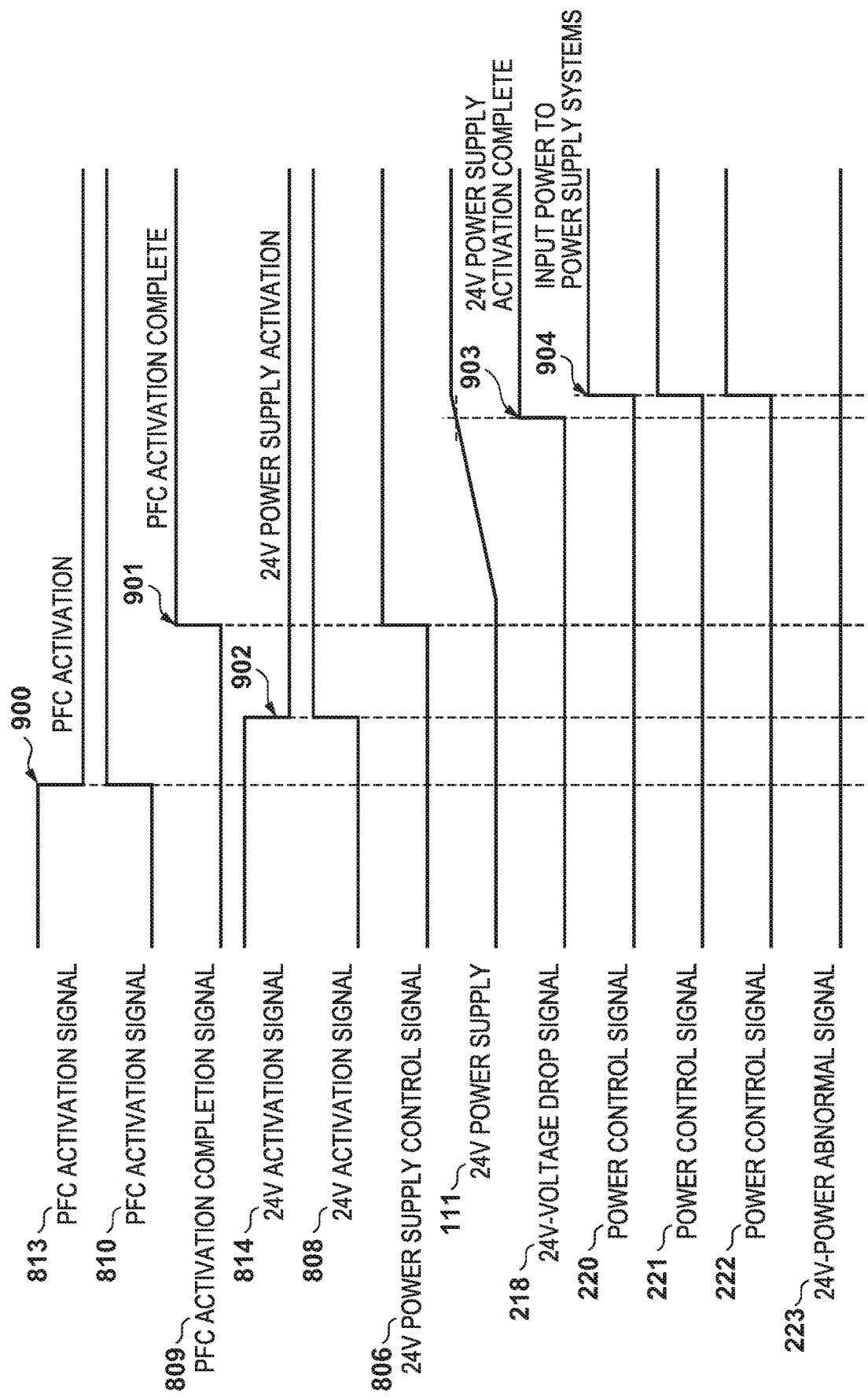
FIG. 9 is a timing chart for explaining operation for a time of activation of the PFC unit and the 24V converter when the image processing apparatus according to the second embodiment of the present invention returns from the power saving mode.

FIG. 9 is a timing chart for explaining operation for a time of activation of the PFC unit 802 and the 24V converter 805 when the image processing apparatus according to the second embodiment of the present invention returns from the power saving mode.

In FIG. 9, upon a return from the power saving mode, to restart operation of the printer unit 103 and the scanner unit 104, at reference numeral 900, the PFC activation signal 813 is set to the low level, and processing for activating the PFC unit 802 of the power supply unit 101 starts. Accordingly, the PFC activation signal 810 is set to the high level via the photocoupler 811 of the power supply unit 101, and the PFC activation signal 810 is inputted to the PFC control circuit 803. Upon detecting that the PFC activation signal 810 has become the high level, the PFC control circuit 803 starts operation of the PFC unit 802, and, after activation of the PFC unit 802 has completed, changes the PFC activation completion signal 809 from the low level to the high level at reference numeral 901.

Next, the power control unit 204 sets the 24V activation signal 814 to the low level at reference numeral 902 to activate the 24V converter 805. The 24V activation signal 814 becomes the 24V activation signal 808 via the photocoupler 812 of the power supply unit 101, and the 24V activation signal 808 is inputted to the AND circuit 807. When the 24V activation signal 808 and the PFC activation completion signal 809 both become the high level, the AND circuit 807 sets the 24V power supply control signal 806 to the high level. In this way, when the 24V power supply control signal 806 becomes the high level, the 24V converter 805 starts a switching operation and outputs the 24V power supply 111. Upon detecting that the voltage of the 24V power supply 111 supplied from the power supply unit 101 has become greater than or equal to a predetermined voltage, the 24V power supply voltage monitoring unit 200, at reference numeral 903, changes the 24V-voltage drop signal 218 from the low level to the high level. Thus, upon detecting that the 24V-voltage drop signal 218 has become the high level, at reference numeral 904, the power control unit 204 changes the power control signals 220, 221, and 222 from the low level to the high level, and starts supply of power to all power supply systems 2-4.

By the second embodiment as explained above, in a configuration where a control signal for a PFC unit and a control signal for a 24V converter are different, an activation completion signal of the PFC unit is used as a part of the control signal for the 24V converter. Accordingly, it is possible to start supply of a 24V power supply after the PFC unit has been reliably caused to operate, while reducing a number of components and suppressing cost.

Third Embodiment

Next, explanation will be given for a third embodiment of the present invention. In the third embodiment, explanation is given with an example in which a PFC control circuit is not present in a PFC unit, and operation of the PFC unit is switched by only a PFC activation signal outputted from the power control unit 204. Note that, in the third embodiment, because a PFC control circuit is not present, to cause the 24V converter to activate after activation of the PFC unit has completed, a 24V activation signal is turned on after a certain amount of time has elapsed, after a PFC activation signal is turned on by a power control unit. Note that a configuration of the image processing apparatus according to the third embodiment and a configuration of a control unit are mostly the same as that in the first embodiment. However, in the third embodiment, there is a difference with the configuration of the control unit 102 of FIG. 2 in that a PFC activation signal 1011 and a 24V activation signal 1012 are supplied from the power control unit 204 to the power supply unit 101 in place of the 24V/PFC activation signal 107.

Figure 10:
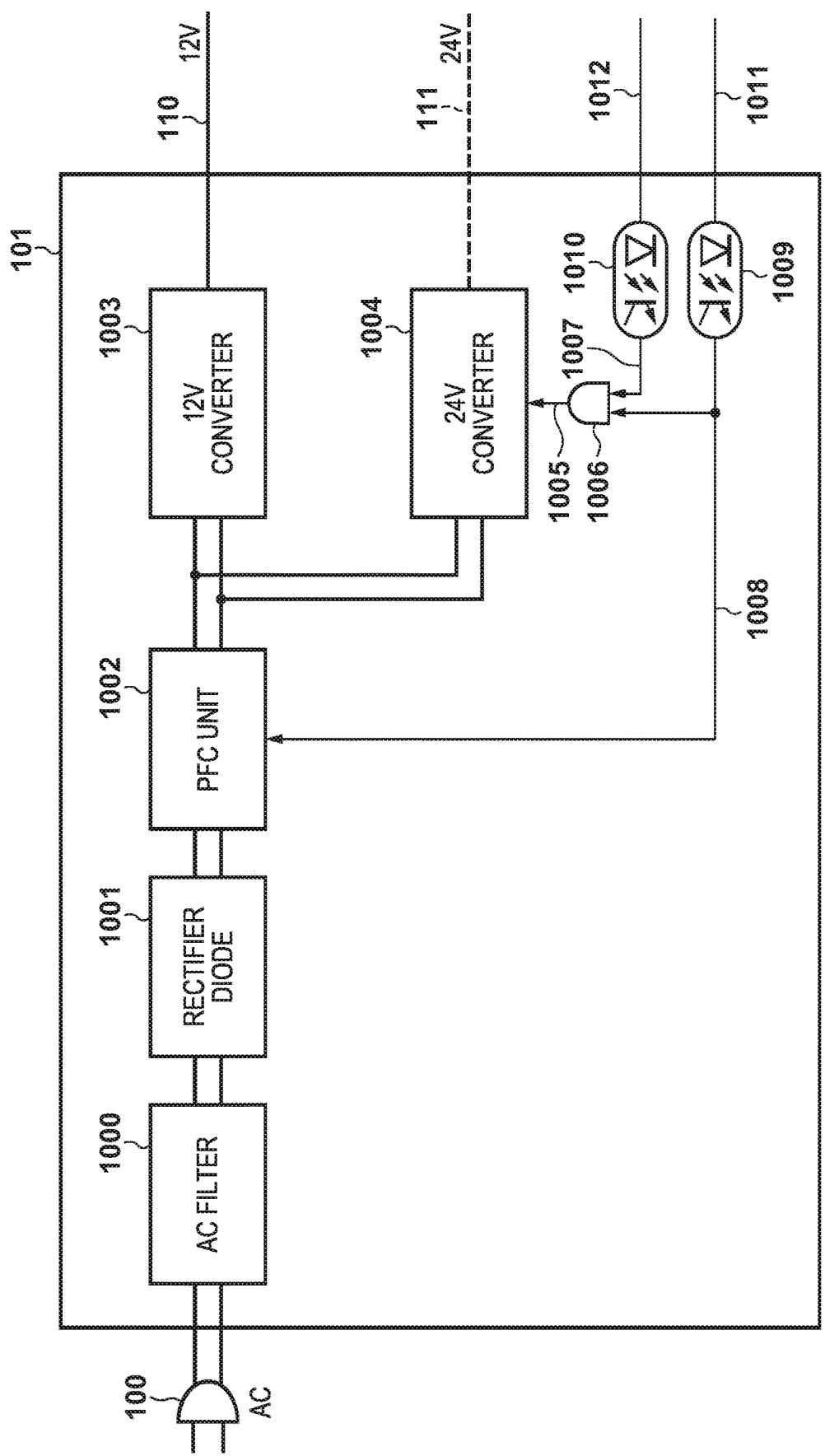
FIG. 10 is a block diagram for explaining a configuration of a power supply unit according to a third embodiment of the present invention.

FIG. 10 is a block diagram for explaining a configuration of the power supply unit 101 according to the third embodiment of the present invention.

The power supply unit 101 has an AC filter 1000, a rectifier diode 1001, a PFC unit 1002, a 12V converter 1003, a 24V converter 1004, photocouplers 1009 and 1010, an AND circuit 1006, or the like. The AC filter 1000 is a noise counter-measure component for removing electromagnetic noise that leaks out of the image processing apparatus or enters the image processing apparatus through the alternating current commercial power supply supplied via the AC plug 100. The rectifier diode 1001 for rectifying the alternating current commercial power supply is connected to an output terminal of the AC filter 1000, and the rectifier diode 1001 converts an alternating power supply to a direct current power supply. The PFC unit 1002 that includes, for example, a booster circuit of a switching type, is connected to an output terminal of the rectifier diode 1001. When the PFC activation signal 1008 enters an off state (the low level), the PFC unit 1002 connects an output terminal of the PFC unit 1002 with an output terminal of the rectifier diode 1001 so that the PFC unit 1002 is bypassed, to reduce power consumed by the PFC unit 1002. The 12V converter 1003 and the 24V converter 1004 are connected to an output terminal of the PFC unit 1002. In accordance with switching control of an internal switch element, the 12V converter 1003 converts a direct-current voltage inputted via the PFC unit 1002 to a predetermined direct-current voltage (12V here) for supplying to each load. In accordance with switching control of an internal switch element, the 24V converter 1004 converts a direct-current voltage inputted via the PFC unit 1002 to a predetermined direct-current voltage (24V here) for supplying to each load. Note that the 24V converter 1004 can switch an operation state in accordance with a signal level of the 24V power supply control signal 1005, and it is possible to stop operation of the 24V converter 1004 by the 24V power supply control signal 1005 being set to the off state (low level). The photocoupler 1009 electrically insulates a primary side and a secondary side, and outputs the PFC activation signal 1008 from the PFC activation signal 1011 outputted from the power control unit 204 of the control unit 102. The photocoupler 1010 similarly electrically insulates a primary side and a secondary side, and outputs the 24V activation signal 1012 outputted from the power control unit 204 of the control unit 102 as a 24V activation signal 1007. The PFC activation signal 1008 is supplied to the PFC unit 1002. The PFC unit 1002 can switch an operation state of the PFC unit 1002 in accordance with the PFC activation signal 1008. The AND circuit 1006 takes a logical product of the 24V activation signal 1007 and the PFC activation signal 1008, and outputs the logical product to the 24V converter 1004 as the 24V power supply control signal 1005.

Figure 11:
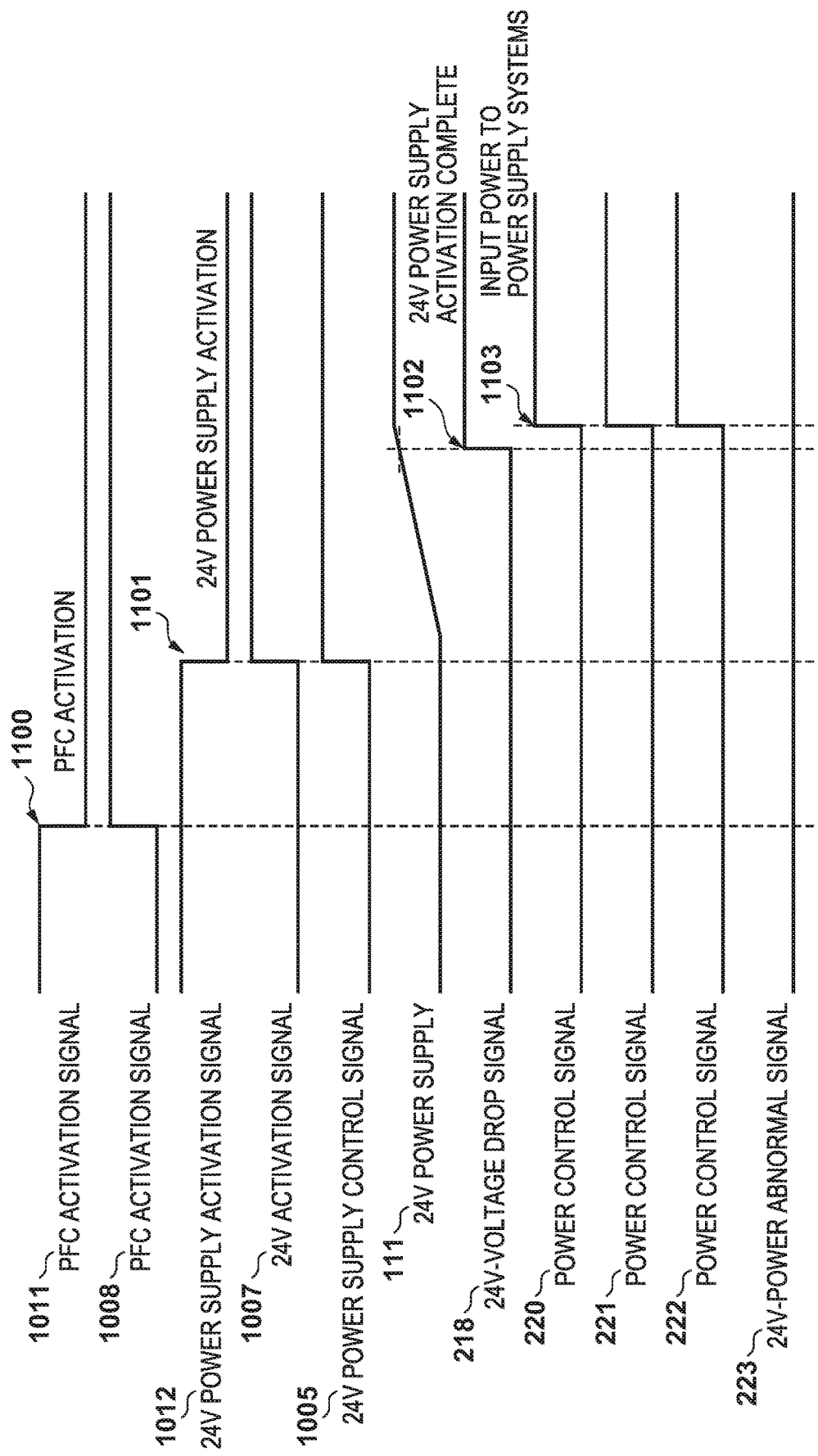
FIG. 11 is a timing chart for explaining operation of the PFC unit and the 24V converter when the image processing apparatus according to the third embodiment of the present invention returns from the power saving mode.

FIG. 11 is a timing chart for explaining operation of the PFC unit 1002 and the 24V converter 1004 when the image processing apparatus according to the third embodiment of the present invention returns from the power saving mode.

In FIG. 11, upon a return from the power saving mode, to restart operation of the printer unit 103 and the scanner unit 104, at reference numeral 1100, the PFC activation signal 1011 is changed to the low level, and processing for activating the PFC unit 1002 of the power supply unit 101 starts. When the PFC activation signal 1011 becomes the low level, the PFC activation signal 1008 is outputted at the high level in accordance with the photocoupler 1009 of the power supply unit 101, and is supplied to the PFC unit 1002. By this, the PFC unit 1002 detects that the PFC activation signal 1008 has become the high level, and starts operation of the PFC unit 1002. Next, after the PFC activation signal 1011 is set to the low level and after a certain amount of time has passed, the power control unit 204 sets the 24V power supply activation signal 1012 to the low level at reference numeral 1101 to activate the 24V converter 1004. When the 24V power supply activation signal 1012 becomes the low level, the 24V activation signal 1007 is outputted at the high level in accordance with the photocoupler 1010 of the power supply unit 101, and is inputted to the AND circuit 1006. When the 24V activation signal 1007 and the PFC activation signal 1008 both become the high level in this way, the AND circuit 1006 changes the 24V power supply control signal 1005 from the low level to the high level. Upon detecting that the 24V power supply control signal 1005 has become the high level, the 24V converter 1004 starts switching control. Upon detecting that the voltage of the 24V power supply 111 supplied from the power supply unit 101 has become greater than or equal to a predetermined voltage, the 24V power supply voltage monitoring unit 200, at reference numeral 1102, changes the 24V-voltage drop signal 218 from the low level to the high level. Thus, upon detecting that the 24V-voltage drop signal 218 has become the high level, at reference numeral 1103, the power control unit 204 changes the power control signals 220, 221, and 222 from the low level to the high level, and starts supply of power to all power supply systems 2-4.

By virtue of the third embodiment as explained above, in a configuration where a control signal of a PFC unit and a control signal of a 24V converter are difference, the 24V activation signal is turned on after a certain amount of time has elapsed after a PFC activation signal is turned on. Accordingly, it is possible to start supply of a 24V power supply after the PFC unit has been reliably caused to operate, while reducing a number of components and suppressing cost.

Fourth Embodiment

Next, explanation will be given for a fourth embodiment of the present invention. The fourth embodiment is explained by a case in which control of a 24V converter and control of a PFC unit are executed by the same control signal, without a PFC control circuit being present in the PFC unit. Note that, in the fourth embodiment, because a PFC control circuit is not present, to cause the 24V converter to activate after activation of the PFC unit has completed, a delay circuit is provided in a power supply unit, and a 24V activation signal is turned on after causing a PFC activation signal to be delayed by a certain amount of time. Note that a configuration of the image processing apparatus according to the fourth embodiment and a configuration of a control unit are mostly the same as that in the first embodiment. However, in the fourth embodiment, there is a difference in that, a 24V/PFC activation signal 1209 is supplied from the power control unit 204 to the power supply unit 101 in place of the 24V/PFC activation signal 107, in the configuration of the control unit 102 of FIG. 2.

Figure 12:
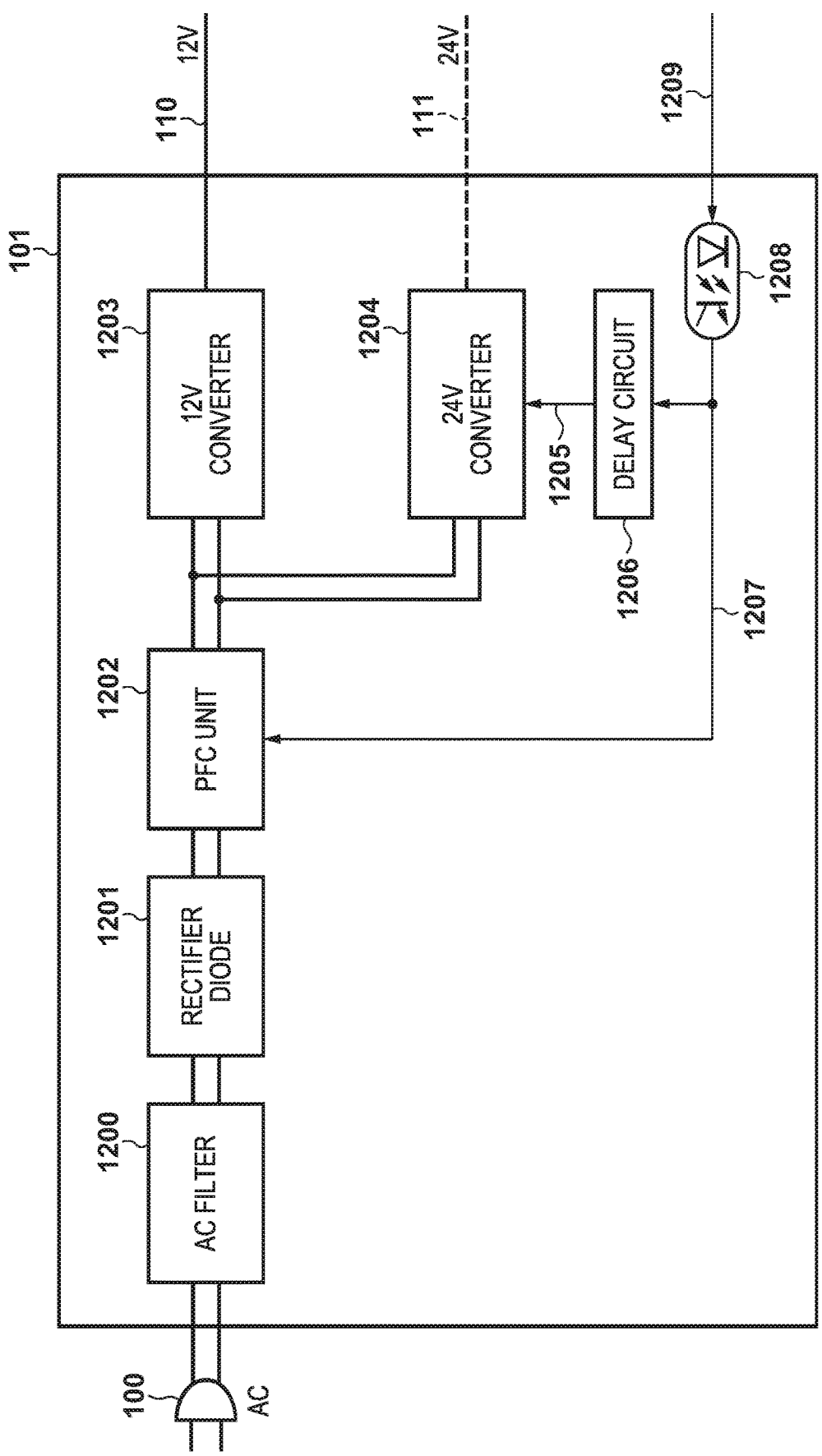
FIG. 12 is a block diagram for explaining a configuration of a power supply unit according to a fourth embodiment of the present invention.

FIG. 12 is a block diagram for explaining a configuration of the power supply unit 101 according to the fourth embodiment of the present invention. The power supply unit 101 has an AC filter 1200, a rectifier diode 1201, a PFC unit 1202, a 12V converter 1203, a 24V converter 1204, a delay circuit 1206, a photocoupler 1208, or the like.

The AC filter 1200 is a noise counter-measure component for removing electromagnetic noise that leaks out of the image processing apparatus or enters the image processing apparatus through the alternating current commercial power supply supplied via the AC plug 100. The rectifier diode 1201 for rectifying the alternating current commercial power supply is connected to an output terminal of the AC filter 1200, and the rectifier diode 1201 converts an alternating current power supply to a direct current power supply. The PFC unit 1202 that includes, for example, a booster circuit of a switching type, is connected to an output terminal of the rectifier diode 1201. The PFC unit 1202 can connect an output terminal of the PFC unit 1202 with an output terminal of the rectifier diode 1201 so that the PFC unit 1202 is bypassed, to reduce power consumed by the PFC unit 1202, when a PFC activation signal 1207 enters an off state (the low level). The 12V converter 1203 and the 24V converter 1204 are connected to an output terminal of the PFC unit 1202. In accordance with switching control of an internal switch element, the 12V converter 1203 converts a direct-current voltage inputted via the PFC unit 1202 to a predetermined direct-current voltage (12V here) to be supplied to each load. In accordance with switching control of an internal switch element, the 24V converter 1204 converts a direct-current voltage inputted via the PFC unit 1202 to a predetermined direct-current voltage (24V here) to be supplied to each load. Note that the 24V converter 1204 can switch an operation state in accordance with a signal level of a 24V power supply control signal 1205, and it is possible to stop operation of the 24V converter 1204 by the 24V power supply control signal 1205 being set to the off state (low level). The photocoupler 1208 electrically insulates a primary side and a secondary side, and generates a 24V/PFC activation signal 1207 from the 24V/PFC activation signal 1209 outputted from the power control unit 204 of the control unit 102 and supplies the 24V/PFC activation signal 1207 to the PFC unit 1202 and the delay circuit 1206. The PFC unit 1202 can switch an operation state of the PFC unit 1202 in accordance with the 24V/PFC activation signal 1207. The delay circuit 1206 causes the 24V/PFC activation signal 1207 to be delayed by a predetermined amount of time, and outputted as the 24V power supply control signal 1205.

FIG. 13 is a timing chart for explaining operation of the PFC unit 1002 and the 24V converter 1004 when the image processing apparatus according to the fourth embodiment of the present invention returns from the power saving mode.

In FIG. 13, when the image processing apparatus returns from the power saving mode, at reference numeral 1300 the 24V/PFC activation signal 1209 is changed to the low level and processing for activating the PFC unit 1202 of the power supply unit 101 starts, to restart operation of the printer unit 103 and the scanner unit 104. Accordingly, the 24V/PFC activation signal 1207 is generated by the photocoupler 1208 of the power supply unit 101 and supplied to the PFC unit 1202 in high level. Upon detecting that the 24V/PFC activation signal 1207 has become the high level, the PFC unit 1202 starts operation of the PFC unit 1202. When the 24V/PFC activation signal 1207 becomes the high level, after delaying by a predetermined amount of time, the delay circuit 1206 changes the 24V power supply control signal 1205 from the low level to the high level at reference numeral 1301 to activate the 24V converter 1204. Upon detecting that the 24V power supply control signal 1205 has become the high level, the 24V converter 1204 starts switching control. Upon detecting that the voltage of the 24V power supply 111 supplied from the power supply unit 101 has become greater than or equal to a predetermined voltage, the 24V power supply voltage monitoring unit 200, at reference numeral 1302, changes the 24V-voltage drop signal 218 from the low level to the high level. Accordingly, the power control unit 204 detects that the 24V-voltage drop signal 218 has become the high level, and, at reference numeral 1303, changes the power control signals 220, 221, and 222 from the low level to the high level, and starts supply of power to all power supply systems 2-4.

By the fourth embodiment as explained above, a control signal for a PFC unit and a control signal for a 24V converter set to be common, and a 24V power supply control signal is turned on after a 24V/PFC activation signal is caused to be delayed by a predetermined amount of time. Accordingly, it is possible to start a power supply after the PFC unit 1202 has been reliably caused to operate, while reducing a number of components and suppressing cost.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-217500, filed Nov. 7, 2016, which is hereby incorporated by reference herein in its entirety.

What is claimed is:

1. A power supply apparatus comprising:
a power factor correction circuit configured to correct a power factor;
a voltage converter connected to a secondary side of the power factor correction circuit;
a power control unit configured to output a first signal for turning the power factor correction circuit on, and output a second signal for turning the voltage converter on; and
a signal output unit configured to, in accordance with an input of the first signal and the second signal, output a signal for turning the voltage converter on,.
wherein the first signal outputted from the power control unit is further inputted to the power factor correction circuit and the signal output unit.

2. The power supply apparatus according to claim 1, further comprising a photocoupler provided on a signal line for connecting the signal output unit and the power control unit.

3. The power supply apparatus according to claim 1, further comprising a photocoupler provided on a signal line for connecting the power factor correction circuit and the power control unit.

4. The power supply apparatus according to claim 1, wherein the power control unit outputs the first signal, and outputs the second signal after a predetermined amount of time has elapsed after outputting the first signal.

5. The power supply apparatus according to claim 4, further comprising:
a switch provided between the voltage converter and a load supplied with power from the voltage converter,
wherein the power control unit further outputs a control signal for turning the switch on after outputting the second signal.

6. The power supply apparatus according to claim 1, wherein the voltage converter supplies power to a print unit.

7. The power supply apparatus according to claim 1, further comprising:
another voltage converter,
wherein the another voltage converter supplies power to the power control unit.

8. A power supply apparatus operable to, upon transitioning to a power saving state, turn a power factor correction circuit off and turn a second voltage converter connected to a secondary side of the power factor correction circuit off while a first voltage converter connected to the secondary side of the power factor correction circuit remains on, the apparatus comprising:
a power control unit configured to output a first signal for turning the power factor correction circuit on and output a second signal for turning the second voltage converter on, when returning from the power saving state; and
a signal output unit configured to, in accordance with an input of the first signal and the second signal, output a signal for turning the second voltage converter on,
wherein the first signal outputted from the power control unit is further inputted to the power factor correction circuit and the signal output unit.

9. The power supply apparatus according to claim 8, further comprising a photocoupler provided on a signal line for connecting the signal output unit and the power control unit.

10. The power supply apparatus according to claim 8, further comprising a photocoupler provided on a signal line for connecting the power factor correction circuit and the power control unit.

11. The power supply apparatus according to claim 8, wherein the power control unit outputs the first signal, and outputs the second signal after a predetermined amount of time has elapsed after outputting the first signal.

12. The power supply apparatus according to claim 11, further comprising a switch provided between the second voltage converter and a load supplied with power from the second voltage converter,
wherein the power control unit further outputs a control signal for turning the switch on after outputting the second signal.

13. The power supply apparatus according to claim 8, wherein the second voltage converter supplies power to a print unit.

14. The power supply apparatus according to claim 8, wherein the first voltage converter supplies power to the power control unit.

15. A method of controlling a power supply apparatus that has a power factor correction circuit for correcting a power factor, a voltage converter connected to a secondary side of the power factor correction circuit, and a power control unit for outputting a first signal for turning the power factor correction circuit on and outputting a second signal for turning the voltage converter on, the method comprising:
- in accordance with an input of the first signal and the second signal, outputting a signal for turning the voltage converter on,
- wherein the first signal outputted from the power control unit is further inputted to the power factor correction circuit and the signal output unit.

16. A method of controlling a power supply apparatus operable to, upon transitioning to a power saving state, turn a power factor correction circuit off and turn a second voltage converter connected to a secondary side of the power factor correction circuit off while a first voltage converter connected to the secondary side of the power factor correction circuit remains on, the method comprising:
- outputting a first signal for turning the power factor correction circuit on and outputting a second signal for turning the second voltage converter on, when returning from the power saving state; and
- in accordance with an input of the first signal and the second signal, outputting a signal for turning the second voltage converter on,
- wherein the first signal outputted from the power control unit is further inputted to the power factor correction circuit and the signal output unit.

* * * * *